US011919005B2

(12) United States Patent
Zero et al.

(10) Patent No.: US 11,919,005 B2
(45) Date of Patent: Mar. 5, 2024

(54) SPECIMEN COLLECTION RECEPTACLE

(71) Applicants: James Frankland Zero, New Oxford, PA (US); John William Nicklin, Arnold, MD (US)

(72) Inventors: James Frankland Zero, New Oxford, PA (US); John William Nicklin, Arnold, MD (US)

( * ) Notice: Subject to any disclaimer, the term of this patent is extended or adjusted under 35 U.S.C. 154(b) by 2 days.

(21) Appl. No.: 17/449,269

(22) Filed: Sep. 29, 2021

(65) Prior Publication Data

US 2023/0095562 A1 Mar. 30, 2023

(51) Int. Cl.
*B01L 3/00* (2006.01)

(52) U.S. Cl.
CPC ......... *B01L 3/508* (2013.01); *B01L 2200/025* (2013.01); *B01L 2200/0615* (2013.01); *B01L 2200/0689* (2013.01); *B01L 2200/082* (2013.01); *B01L 2200/085* (2013.01); *B01L 2300/042* (2013.01); *B01L 2300/047* (2013.01); *B01L 2300/069* (2013.01)

(58) Field of Classification Search
CPC ...... B01L 3/50; B01L 3/508; B01L 2200/025; B01L 2200/0615; B01L 2200/0689; B01L 2200/082; B01L 2300/04; B01L 2300/041; B01L 2300/042; B01L 2300/043; B01L 2300/046; B01L 2300/047; B01L 2300/049; B01L 2300/069
See application file for complete search history.

(56) References Cited

U.S. PATENT DOCUMENTS

2012/0088310 A1* 4/2012 Van Doorn .............. G01N 1/44 422/554
2013/0175266 A1* 7/2013 Ellis ........................ B01L 3/502 220/23.87
2018/0193830 A1* 7/2018 Nishikawa ............. B01L 3/502

FOREIGN PATENT DOCUMENTS

WO WO-2011073729 A1 * 6/2011 ......... A61B 10/0096

* cited by examiner

*Primary Examiner* — Matthew D Krcha
*Assistant Examiner* — Austin Q Le
(74) *Attorney, Agent, or Firm* — Laubscher & Fretwell, P.C.

(57) ABSTRACT

A fluid specimen collection receptacle includes a cup containing a chamber and an open end and a lid for connection with the cup open end and closing the cup chamber. A closure and a specimen collection needle are connected with the lid and a reservoir is arranged beneath the lid and connected with the closure for rotation relative to the lid between open and closed positions. The closure affords access to the needle when the closure is in the open position and prevents access to the needle when the closure is in the closed position. The reservoir includes a chamber closed by a portion of the lid when the closure is in the open position. When the closure is rotated to the closed position, the reservoir is opened for communication with the cup chamber to release an absorbent material from the reservoir chamber into the cup chamber to solidify any residual fluid specimen within the cup chamber.

7 Claims, 4 Drawing Sheets

FIG. 2
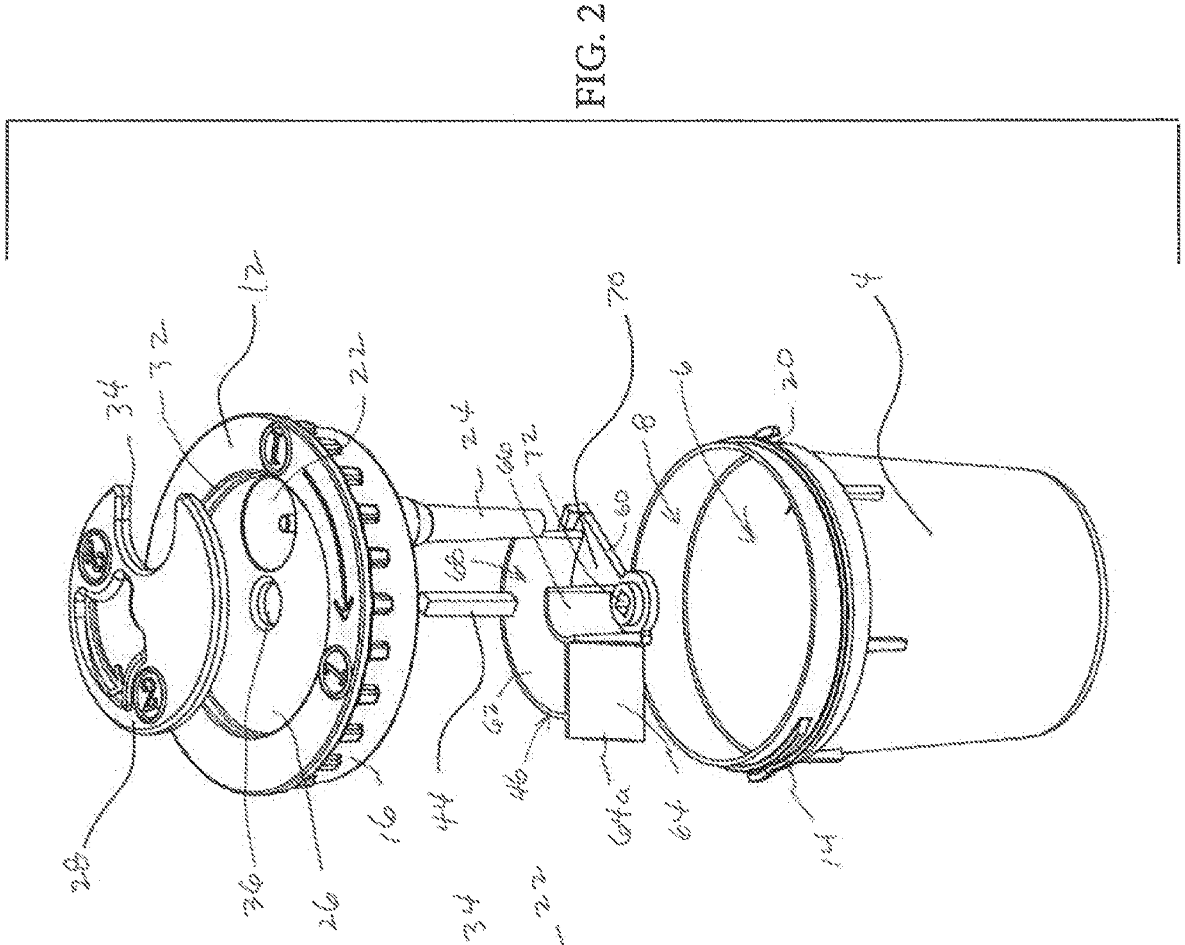
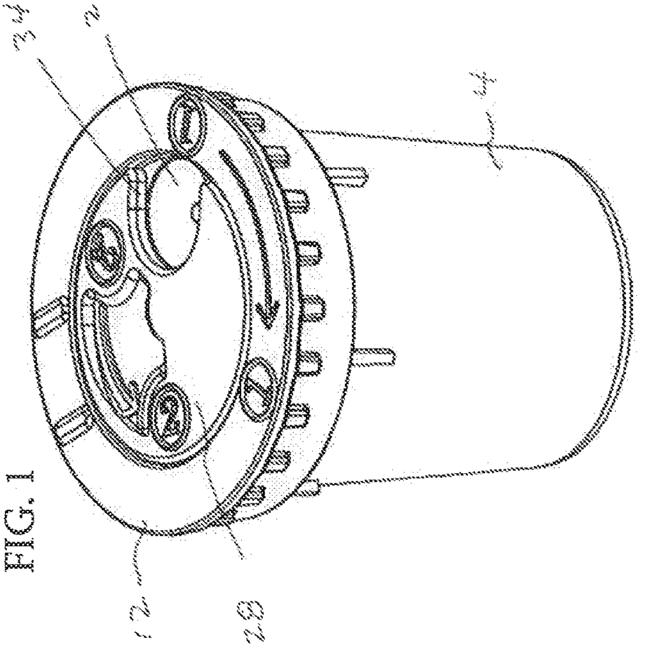
FIG. 1

SPECIMEN COLLECTION RECEPTACLE

BACKGROUND OF THE INVENTION

The present invention relates to urine collection specimen cups, and more particularly to a specimen collection receptacle including an absorbent material for solidifying a fluid specimen remaining in the collection cup in anticipation of disposal as standard waste, and not Regulated Medical Waste which is more expensive.

Urine collection specimen cups and other like devices designed as closed systems benefit healthcare workers by reducing exposure to potentially hazardous specimens. These closed system products allow healthcare workers and lab technicians to collect and transfer urine specimens in a safe and efficient manner. The natural tendency of the end-user, after extracting a specimen from the cup, is to discard the cup and remaining contents into a trash receptacle for final disposal. This disposal method, however, is not proper. Because of the potential for exposure to exposed needles and free flowing liquids these specimen cups must be disposed of as Regulated Medical Waste in accordance with the U.S. Environmental Protection Agency's Medical Waste Management Act. To properly dispose of a specimen cup, consideration must be given to three categories of concern: safety, regulatory and sanitation.

Closed system specimen collection cup assemblies may include an exposed needle ("sharp") arranged in the lid and configured for drawing fluid out of the cup. The exposed sharp presents a hazard to technicians and anyone else handling the cup during transport and disposal as waste. The sharp could puncture the handler's skin causing injury and/or exposure to a potentially harmful pathogen. To this end, many states require removal and placement of the lid into a sharps container for disposal. Where not required by law, manufacturers often recommend the practice.

After removing the lid, any fluid remaining in the cup is discarded, preferably into a sink or toilet. Splash effects from dumping cup contents defeats the purpose of a closed system and exposes technicians to the potentially hazardous specimens. After the fluid is discarded, the cup, with any remaining residue, is placed into the trash, exposing trash handlers to the same hazards.

An alternative disposal method involves placing the entire specimen cup, including any remaining fluids, directly into a sharps container. Placement of the entire specimen cup and any quantity of free-flowing liquids into a sharps container, however, violates the U.S. Department of Transportation's prohibition against the disposal of free-flowing liquids into containers of regulated medical waste. The regulations do, however, permit specimen cup disposal in sharps containers if liquids are solidified or if enough absorbent is placed into the sharps container to solidify any and all liquids contained therein. To solidify the liquid in a specimen cup, the lid is removed and absorbent material is added. This action defeats the intended purpose of the closed system design by exposing technicians to potentially hazardous specimens. In another drawback, technicians must determine not only the volume of liquid in the sharps container, but also the quantity of absorbent necessary to solidify any and all liquids. Furthermore, if a spill does occur, there is no guarantee that the absorbent and liquid will come into contact. Hazards associated with spill clean-up are therefore increased.

Urine collection specimen cups and other closed systems were designed to assist healthcare facilities and laboratories with maintaining sanitary conditions, including control of infection rates and contamination. When dealing with specimen liquids, the best practice is to eliminate the risk of contamination or spill as soon as possible by dumping or solidifying the remaining liquid specimen soon after obtaining a specimen sample. Either of these functions requires removal of the lid, increasing the risk of exposure to technicians and facility environments. Such practices defeat the closed system approach. When dumping liquid specimens, there is a risk that technicians and surrounding areas will be splashed. To reduce contamination, any splash should be cleaned up immediately. If liquids are solidified, technicians can underestimate the quantity of absorbent material necessary to solidify waste specimens. Adding more absorbent material than necessary can create an overflow situation requiring immediate clean up. Odor is also an issue. If the cups are not properly rinsed prior to disposal, residue within in the cups will permeate the environment with strong odors.

SUMMARY OF THE INVENTION

The present disclosure was developed to overcome these and other drawbacks of prior specimen cup assemblies by providing a closed system specimen collection receptacle designed to address all safety, regulatory and sanitary concerns associated with disposal following sample extraction. The specimen collection receptacle includes a cup containing a chamber and an open end and a lid for connection with the cup open end to close the cup chamber. A specimen collection needle is connected with the lid and configured for extracting, a sample from the cup chamber. The needle extends into the cup chamber when the lid is connected with the cup. A closure is retained on an upper surface of the lid and is configured for rotational movement relative to the lid between open and closed positions. The closure affords access to the needle when the closure is in the open position and prevents access to the needle when the closure is in the closed position.

A reservoir is connected with the closure and arranged below a lower surface of the lid. The reservoir contains a chamber configured for storing a quantity of an absorbent material separate from the cup chamber until ready for use. More particularly, when the closure is in the open position, the reservoir chamber is closed by a projection extending from a bottom surface of the lid. When the closure is rotated to the closed position, the reservoir is rotated away the lid projection to open the reservoir for communication with the cup chamber to release the absorbent material from the reservoir chamber into the cup chamber to solidify any liquid within the cup chamber. The specimen collection receptacle with the solidified liquid material may then be disposed of as standard waste as opposed to regulated medical waste.

The act of "closing" the invention therefor satisfies both environmental (US Environmental Protection Agency) and safety (US department of Transportation) regulations thereby rendering the entire device safe to discard as standard waste.

BRIEF DESCRIPTION OF THE DRAWINGS

Other objects and advantages of the invention will become apparent from a study of the following disclosure when viewed in the light of the accompanying drawing, in which:

FIG. 1 is a top perspective of the specimen collection receptacle according to the invention;

FIG. 2 is an exploded perspective view of the specimen collection receptacle of FIG. 1;

DETAILED DESCRIPTION

Figure 5:
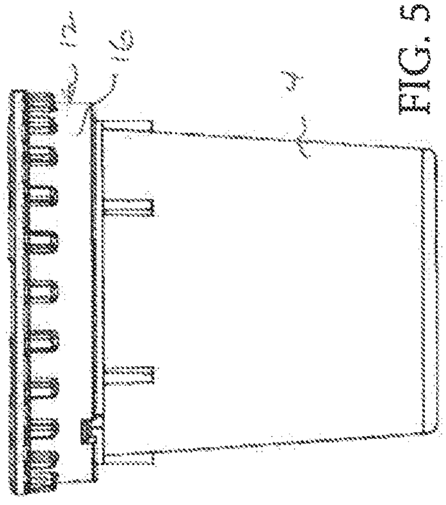
FIG. 5 is a front plan view of the specimen collection receptacle of FIG. 1.

The specimen collection receptacle 2 illustrated in FIGS. 1 and 2 includes a cup 4 containing a chamber 6 and an open end 8 for receiving a fluid specimen 10 such as urine or blood, and a lid 12 for connection with the cup open end 8 to close the cup chamber 6. The cup 4 includes a screw thread 14 on an outer surface thereof adjacent the open end. The lid includes screw thread (not shown) on an inner surface of a downwardly projecting portion 16 thereof configured to mate with the cup screw thread to close the cup open end. It will be appreciated by those of ordinary skill in the art that other suitable connections such as a press pin or snap fit connection may be used to connect the lid with cup in a secure manner.

Figure 6:
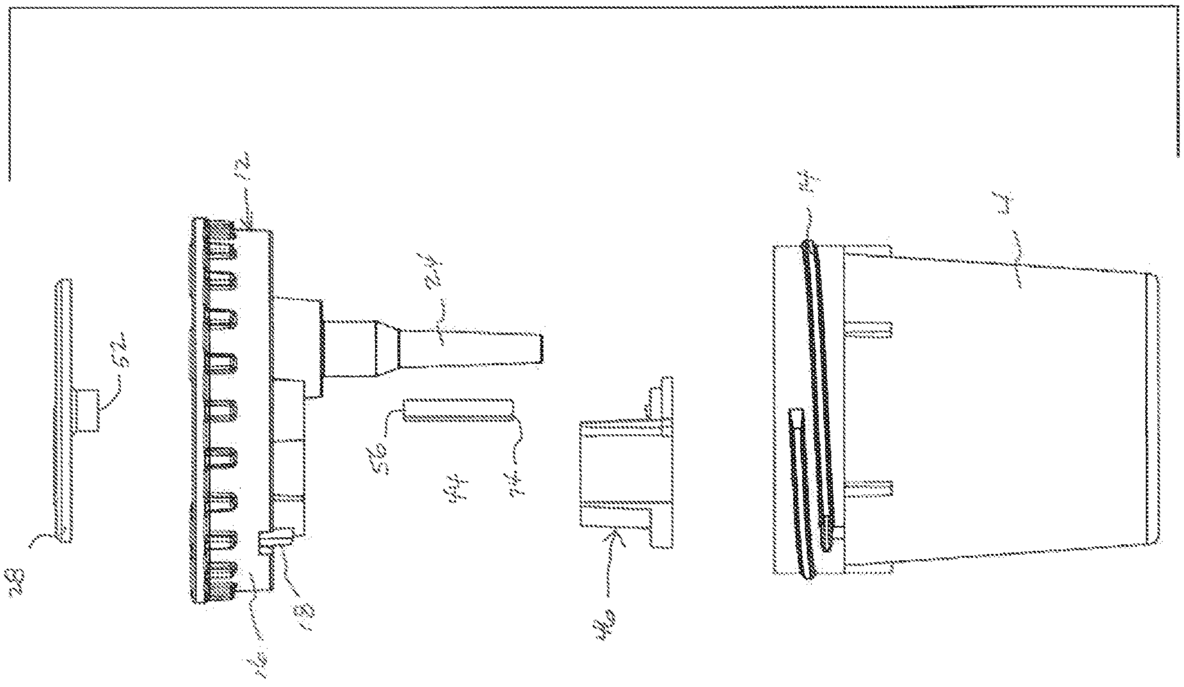
FIG. 6 is an exploded front plan view of the specimen collection receptacle of FIG. 1.

As shown in FIG. 6, a tab 18 extends from the downwardly projecting portion 16 of the lid and engages a slot 20 arranged on an exterior surface of the cup adjacent to the open end. The slot 20 may be arranged with the cup screw threads as shown in FIG. 2. Once the tab 18 engages the slot 20 the lid 12, it prevents reverse rotation of the lid to lock the lid onto the cup 4.

The lid 12 contains a through opening 22 configured for receiving an exposed specimen collection needle 24. The needle 24 extends into the cup chamber 6 when the lid is connected with the cup. The opening in the lid allows a technician to connect a syringe (now shown) with the needle.

Figure 3:
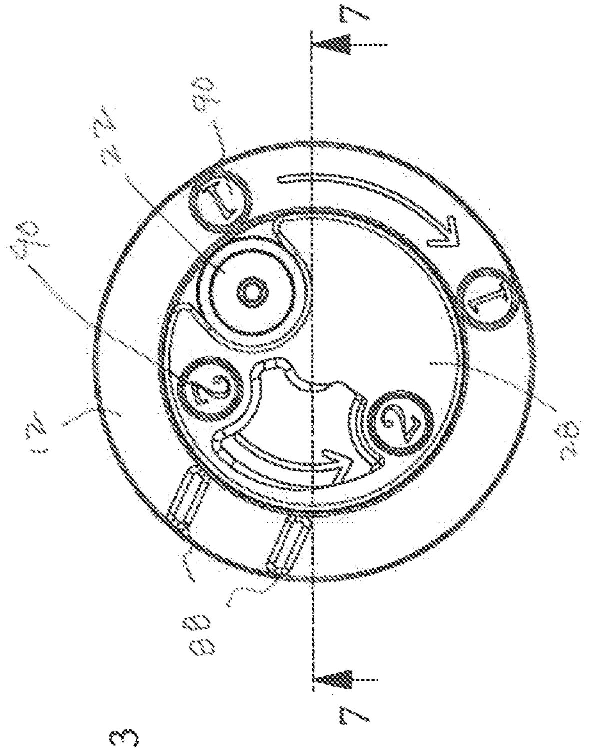
FIG. 3 is a top plan view of the specimen collection receptacle of FIG. 1 illustrating a closure of the lid in an open configuration.
Figure 4:
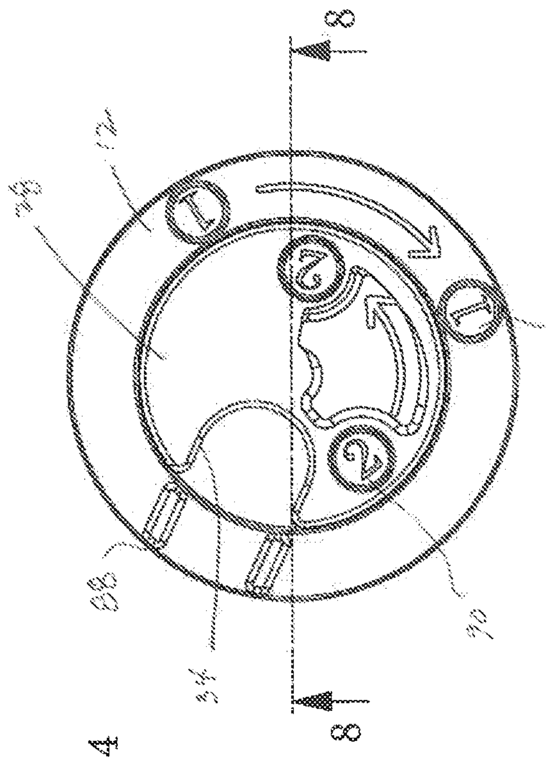
FIG. 4 is a top plan view of the specimen collection receptacle of FIG. 1 illustrating the closure of the lid in a closed configuration.

An upper surface 25 of the lid 12 includes a recess 26 configured for receiving a closure 28. More particularly, an annular channel 32 is provided around the recess with the closure being arranged in the channel on an upper surface of the lid in a snap fit configuration for rotation relative to the lid between open and closed positions. More particularly, the closure includes a cut-out or recess 34 in an outer edge configured to correspond with the opening 22 in the lid above the needle 24. The open position of the closure is shown in FIG. 3, wherein the closure recess 32 is above the lid opening 22 to afford access to the needle. The closed position of the closure is shown in FIG. 4 wherein the closure covers the lid opening 22

Figure 8:
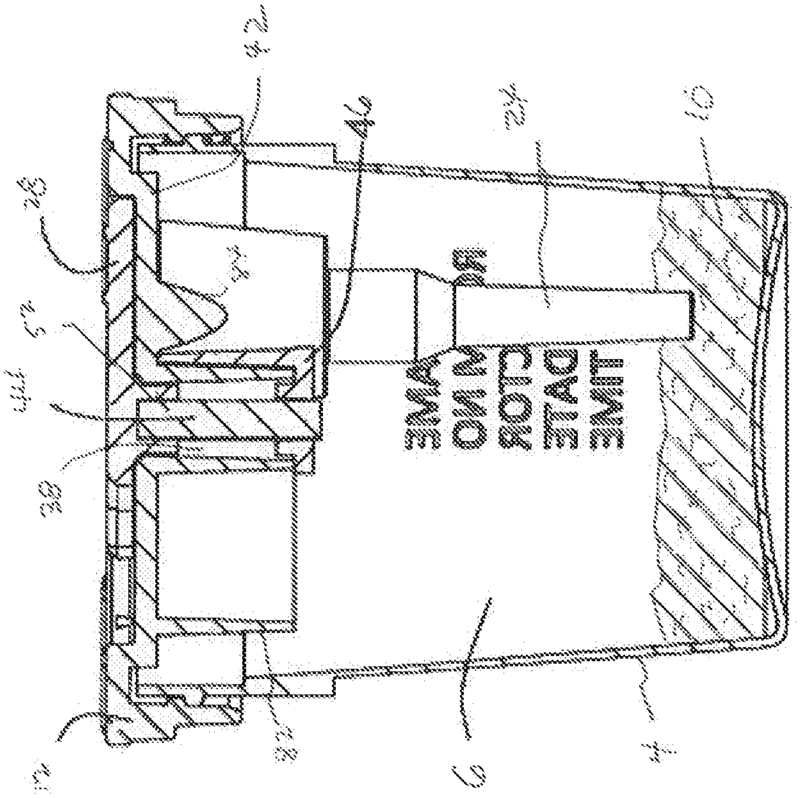
FIG. 8 is a cross-sectional view of the specimen collection receptacle taken along line 8-8 of FIG. 4.
Figure 7:
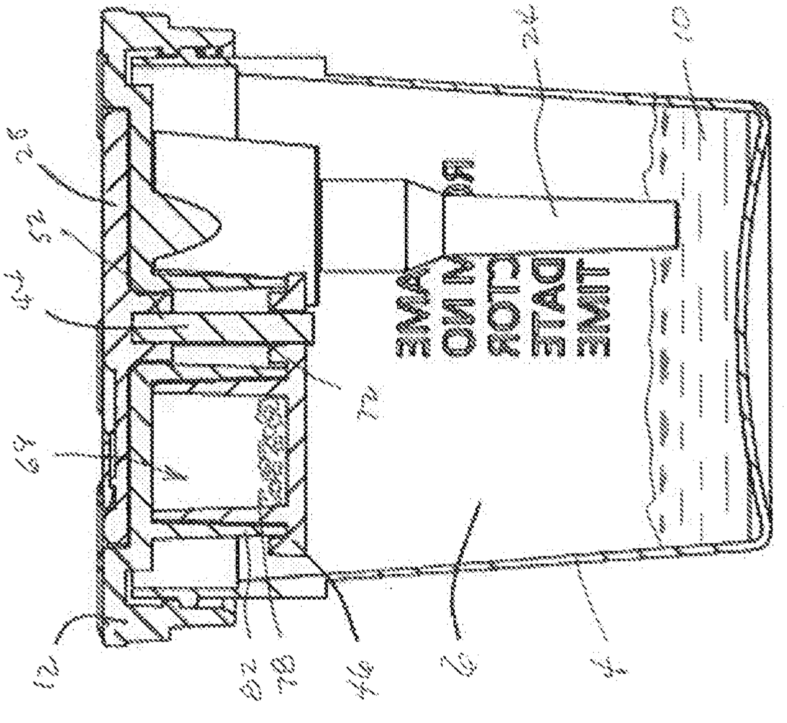
FIG. 7 is a cross-sectional view of the specimen collection receptacle taken: along line 7-7 of FIG. 3.

The lid 12 further includes a central through opening 36. The through opening 36 communicates with a cylindrical keyway 38 defined by a wall 40 extending downwardly from a lower surface 42 of the lid 12 as shown in FIGS. 7 and 8. The keyway 38. A key 44 extends through the keyway and is configured to connect the closure 28 with a reservoir 46. More particularly, the closure bottom surface contains a recess 52 configured to correspond with the configuration of the key such that the upper end 56 of the key is arranged in the closure recess. Similarly, an upper surface of the reservoir contains a recess 72 configured to correspond with the configuration of the key such that the lower end 74 of the key is arranged in: the reservoir recess. Accordingly, rotation of the closure 28 relative to the lid 12 also rotates the reservoir 46.

The reservoir 46: includes a bottom wall 60 and a plurality of side walls 62, 64, 66 to define a chamber 68 having an opening 70 as shown in FIG. 2. The reservoir chamber 68 is configured to receive and store an absorbent composition 78.

A lower surface 42 of the lid 12 includes a plurality of walls extending downwardly therefrom. One downwardly extending wall 82 cooperates with reservoir 46 to close the reservoir chamber opening 70 as shown in FIG. 7 when the closure 28 is in the open position. When the reservoir chamber 70 is closed by the lid housing 68, the absorbent composition 78 is retained in the reservoir chamber 68. As the closure 28 is rotated from the open position to the closed position, the reservoir 46 rotates with the closure relative to the lid to expose the reservoir chamber opening 70 which allows the absorbent composition 78 to be released from the reservoir chamber 68 into the cup chamber 6 to absorb and solidify any residual fluid specimen 10 remaining within the cup chamber 6 after a sample of the specimen has been withdrawn from the cup chamber 6. The quantity of absorbent material in the reservoir chamber is selected according to the capacity of the cup to insure that any residual specimen in the cup is absorbed.

Another wall 84 extending downwardly from the lid acts as a stop to restrict the range of rotational movement of the closure 28 (FIGS. 7-8), More particularly, one of the plurality of reservoir side walls 64 includes an extension portion 64*a*. As the closure 28 is rotated from the open position to the closed position, the tab 64*a* engages the wall 84 to prevent further rotation of the closure 28. Indicia 88, 90 on the upper surface 48 of the lid 12 indicates to a user whether the closure 28 is open or closed and whether the reservoir chamber 68 is closed or open.

While the preferred forms and embodiments of the invention have been illustrated and described, it will be apparent to those of ordinary skill in the art that various changes and modifications may be made without deviating from the inventive concepts set forth above.

What is claimed is:

1. A specimen collection receptacle, comprising:

a) a cup containing a chamber and an open end;

b) a lid for connection with said cup open end and closing said cup chamber;

c) a closure connected with an upper surface of said lid for rotation relative to said lid between open and closed positions;

d) a specimen collection needle connected with said lid and extending into said cup chamber when said lid is connected with said cup, said closure affording access to said needle when said closure is in said open position, said closure preventing access to said needle when said closure is in said closed position; and e) a reservoir arranged beneath said lid and connected with said closure for rotational movement relative to said lid via said closure, said reservoir including a bottom wall and a side wall defining a chamber beneath said lid, said side wall containing an opening, said reservoir being rotated to a closed position via said closure when said closure is rotated to said open position and said reservoir being rotated to an open position via said closure when said closure is rotated to said closed position thereby affording communication between said reservoir chamber and said cup chamber.

2. The specimen collection receptacle of claim 1, wherein said lid contains a central opening and further comprising a key extending through said central opening, an upper end of said key being connected with a bottom surface of said closure and a lower end of said key being connected with said reservoir bottom wall, whereby rotation of said closure rotates said reservoir relative to said lid.

3. The specimen collection receptacle of claim 2, wherein a lower surface of said lid includes at least one wall arranged adjacent to said lid opening, wherein when said closure is in said open position said lid at least one wall cooperates with said reservoir side wall to define a closure for said reservoir chamber.

4. The specimen collection receptacle of claim 3, wherein said lid includes a stop and said reservoir side wall includes a projection which engages said stop to restrict movement of said closure beyond said closed position.

5. The specimen collection receptacle of claim 1, wherein said lid is connected with said cup via one of a screw thread and press pin connection.

6. The specimen collection receptacle of claim 5, wherein said one of a screw thread and press pin connection includes a locking assembly to lock said lid onto said cup.

7. The specimen collection receptacle of claim 1, and further comprising an absorbent composition arranged in said reservoir, said absorbent composition being released from said reservoir chamber for entry into said cup chamber when said closure is in the closed position, whereby a specimen within said cup chamber is absorbed.

* * * * *